Figure 1:
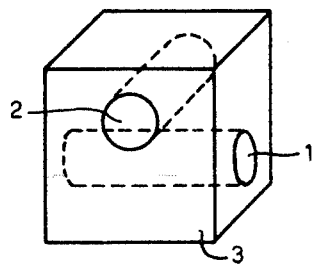

United States Patent [15] 3,668,070
Fiebelmann et al. [45] June 6, 1972

[54] NUCLEAR REACTOR WITH HEAT PIPES FOR HEAT EXTRACTION

[72] Inventors: Peter Fiebelmann, Besozzo; Helmut Neu, Travedona, both of Italy

[73] Assignee: European Atomic Energy Community (Euratom), Brussels, Belgium

[22] Filed: May 12, 1969

[21] Appl. No.: 823,681

[30] Foreign Application Priority Data

May 21, 1968 Germany.....................P 17 64 347.9

[52] U.S. Cl.......................................176/40, 176/39, 310/4, 165/105, 176/41, 176/43
[51] Int. Cl.......................................................G21k 14/00
[58] Field of Search...................176/39–43; 310/4; 165/105

[56] References Cited

UNITED STATES PATENTS

| | | | |
|---|---|---|---|
| 2,931,762 | 4/1960 | Fermi | 176/61 |
| 3,094,473 | 6/1963 | Humbach | 176/61 |
| 3,264,191 | 8/1966 | Huntington | 176/41 |
| 3,302,042 | 1/1967 | Grover et al. | 176/39 |

*Primary Examiner*—Reuben Epstein
*Attorney*—Stevens, Davis, Miller & Mosher

[57] ABSTRACT

A nuclear reactor with a heat extraction system comprising two groups of heat pipes which extend through the reactor core and which deliver heat to heat sinks disposed outside the core. All pipes of one group being parallel, the two groups are arranged in a mutual right angle relation and they intersect each other.

3 Claims, 3 Drawing Figures

PATENTED JUN 6 1972 3,668,070

SHEET 1 OF 2

INVENTOR's
Peter Fiebelmann
Helmut Neu
Stevens, Davis, Miller & Mosher
ATTORNEYS

NUCLEAR REACTOR WITH HEAT PIPES FOR HEAT EXTRACTION

The invention relates to a nuclear reactor with a heat extraction system comprising a plurality of hermetically sealed heat pipes, one end of these heat pipes extending into the reactor core.

Proposals have recently been made for the extraction of reaction heat from a reactor core (see for example French Patent Specification No. 1,455,672) in which the conventional integral cooling system with coolant flowing through a plurality of ducts of the reactor core was replaced by a plurality of cooling circuits disposed in parallel to each other and being completely independent of each other. Each cooling circuit comprises a hermetically sealed, so-called heat pipe, partially filled with a thermal transfer medium and adapted to extend into the core to dissipate the heat, with very small losses, to a heat sink disposed in the region of a part of the pipe which extends from the core. The heat sink is preferably constructed as a direct energy converter (for example in accordance with the thermionic principle).

One of the difficulties which militates against the practical application of the aforementioned heat pipe cooling system is the danger which flows from a possible failure of a single heat pipe. An excessive temperature rise would then occur in the zone surrounding the defective heat pipe, the adjacent heat pipes being unable to absorb said temperature rise so that the fuel elements could melt. In view of the very high normal operating temperatures of 1,500° C and more required for thermionic converters it is not possible reliably to prevent the failure of a heat pipe, for example due to corrosion of the pipe walls. In parallel heat pipe systems there is no substantial thermal contact between adjacent heat pipes, particularly in thermal reactors in which each heat pipe is provided with its own fuel shell and a moderator of low operating temperature is disposed between fuel elements. Failure of a heat pipe in such cases will inevitably be followed by melting of the fuel.

The catastrophic consequences described hereinabove of the failure of a single heat pipe are avoided or lessened in the reactor concept according to the invention.

According to the invention the heat pipes are not disposed throughout in parallel but are subdivided into two groups with axial orientations of the heat pipes disposed at an angle relative to each other and the axes of the two groups intersect in the core zone. Under these conditions not only may two to six heat pipes be disposed in the immediate neighborhood of any pipe which may become defective but a substantially larger number of heat pipes may intersect their cooling area thus ensuring adequate heat dissipation.

In a preferred embodiment of the invention the reactor core is constructed of a plurality of substantially cube-shaped fuel elements each of which is provided with two bores disposed orthogonally to each other and in parallel to two of its principal axes, the elements in the core being stacked with the bores of the elements in alignment with each other so as to accommodate heat pipes therein. In a preferred embodiment the heat pipes extend through the entire core zone and are mechanically retained or supported via thermal and electrical insulators only in the zone of a reflector which surrounds the core zone. To prevent damage to the heat pipes due to varying thermal expansion between the core and the reflector it is advantageous to extend the heat pipes freely through the core ducts and to allow thermal transfer to take place by radiation. Such a procedure also offers the advantage of dispensing with the need for supporting insulators in the core zone which would have to be exposed to the extremely high temperatures of the core.

Figure 2:
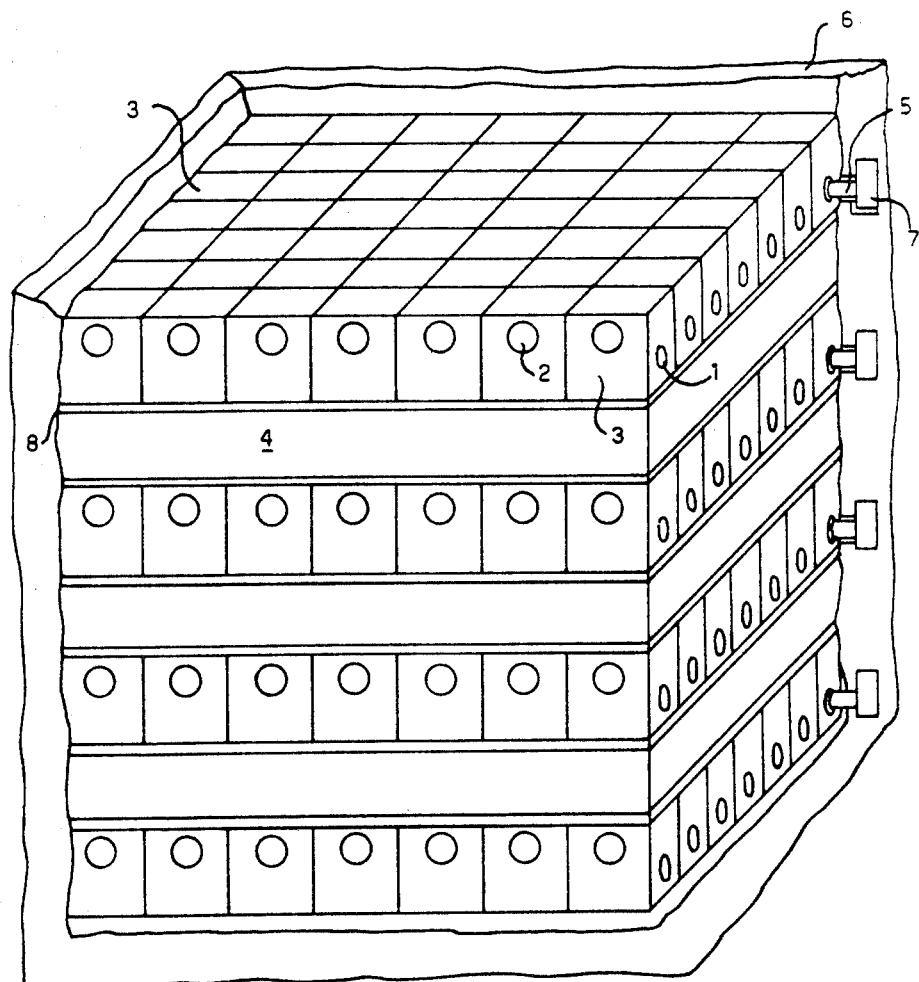
Figure 3:
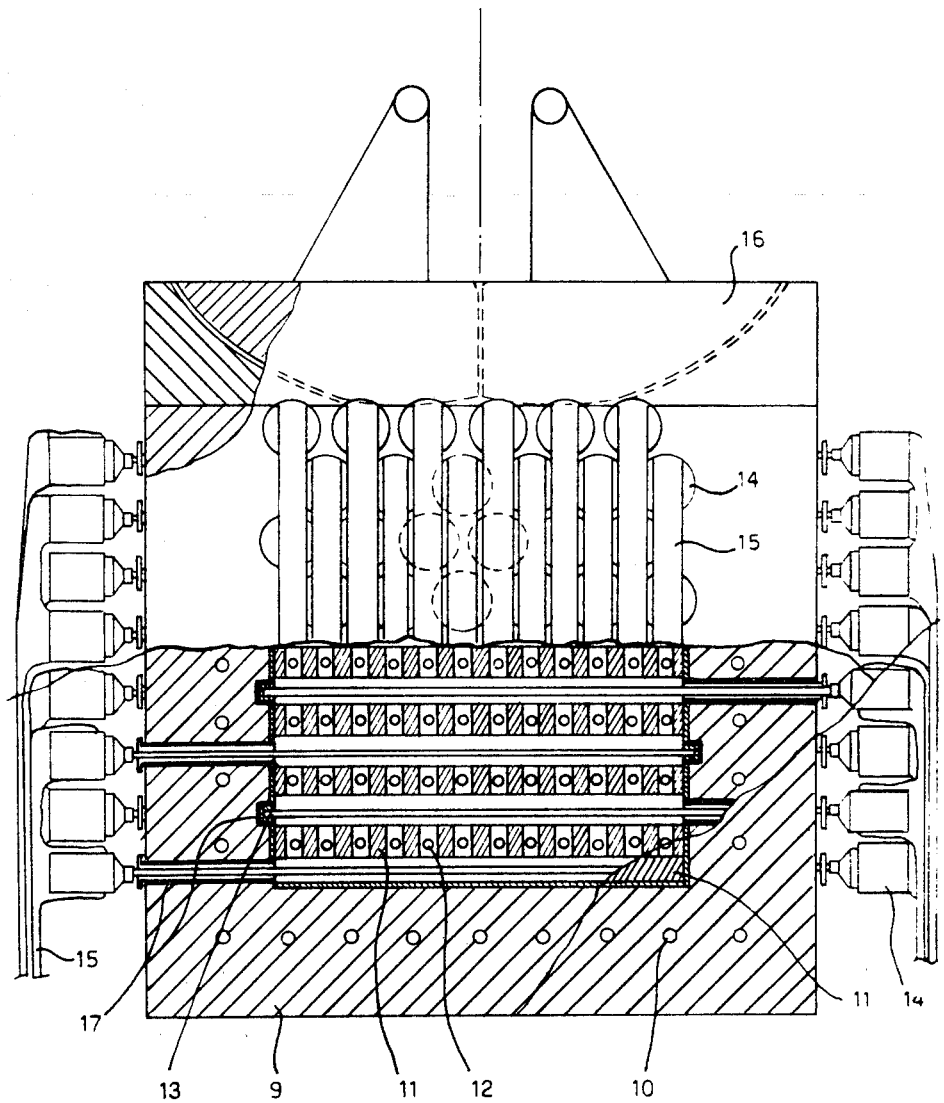

Some specific examples of the invention will now be described with reference to the accompanying drawings in which:

FIG. 1 is a view of a fuel element,
FIG. 2 is a partially sectioned view of a reactor core;
FIG. 3 is a partially sectioned view of another reactor core.

The cube-shaped fuel element illustrated in FIG. 1 is traversed in different horizontal planes by two superjacently disposed bores. The bores are in each case disposed parallel to a cube axis. The bore diameter is sufficiently large to enable the intended heat pipes to be inserted therein with clearance. The fuel elements contain the nuclear fuel which is distributed in a matrix of good thermal conductivity. For example uranium oxide cement or uranium carbide, stabilized with ZrC may be employed to this end.

The reactor core according to FIG. 2 is constructed from such cube-shaped elements. A substantially square stratum of fuel elements 3 alternates in each case with a stratum comprising moderator elements 4. The fuel element blocks are disposed adjacently so that the holes 1 and 2 for the heat pipes 5 are in alignment. Said heat pipes project from the reactor core and are mechanically held in the region of a reflector shell 6 which surrounds the core and are connected to thermionic converters 7. Thermal shields 8 are provided between the strata of fuel and moderator elements and the moderator elements are traversed by a separate cooling system, not shown, in order to maintain a low temperature of the moderator which may consist for example of flat discs of metalhydrides. The separate cooling system may be a conventional circuit or may operate in accordance with the heat pipe principle. The moderator and heat shields are omitted in the case of a fast reactor.

If the thermal conductivity of the fuel elements is sufficiently high, the temperature rise on a defective heat pipe will remain low because the amount of heat normally dissipated by the defective heat pipe is uniformly transferred over a plurality of the aforementioned intersecting heat pipes.

FIG. 3 is a view partly in section of a nuclear reactor which is provided as an energy source for a space station and incorporates heat pipes for heat extraction disposed in the intersected manner according to the invention. The reactor is completely surrounded by a reflector shell 9 whose temperature is maintained at approximately 800° C by means of a cooling circuit (cooling ducts 10). The reactor core itself comprises a plurality of fuel rods 11 which are disposed in a plurality of superjacent layers, the axes of the rods in adjacent layers being perpendicular to each other, as viewed in plan.

A space through which a heat pipe 12 extends is disposed between each two fuel rods of a layer. The dimensions of the space and of the heat pipe are selected to avoid that said heat pipe touches the fuel at any position. Instead, the heat pipe is held in the region of the reflector 9. The heat pipes traverse the entire core and their ends 13, distal relative to the cooling zone, are retained in recesses of the reflector shell by means of a thermal and electrical insulating stratum 17. The cooling zones of the heat pipes are disposed outside the reflector and are directly coupled to thermionic converters 14. Thermal and electrical insulating strata 17 are also provided where the heat pipes pass through the reflector. For the sake of completeness reference is also made to the collector side heat pipes 15 which duct the waste heat losses from the converters to radiating coolers not shown, reference also being made to movable reflector elements 16 for controlling the reactivity.

The principle employed herein for transferring heat from the fuel to the heat pipes by means of radiation ensures that all supporting and insulating elements may be disposed in the region of the relatively cool reflector and that slightly different coefficients of expansion between the heat pipes or the reflector shell and the fuel can be absorbed without operational defects. The temperature of the reactor core with an operating power of for example 500 kW was fixed at 1,600° C in the present example to enable the thermionic converters 14 to operate in a favorable power range.

Thermal insulation for the holding means of the heat pipes may comprise tungsten, which, in the form of sheeting, is coiled around the heat pipes so that small spacers form insulating spaces between the individual coils. The electrically insulating stratum of ceramic material disposed thereabove need then only withstand a temperature of up to 800° C.

Although disposing the heat pipes in parallel to two principal axes of the reactor core represents the geometrically simplest solution of the problem, the invention may also be performed with heat pipes extending at an angle through the fuel elements and with other forms of fuel element. The invention, as applied to thermal reactors in which the fuel is disposed in a moderating matrix or adjacent to moderator elements, may also be applied to a so-called fast reactor in which the moderating elements are omitted.

We claim:

1. A nuclear reactor with a heat extraction system comprising a plurality of hermetically sealed heat pipes, which extend through the core zone and are mechanically held by means of thermal and electrical insulators in the zone of a reflector surrounding the core zone, the heat pipes being subdivided into two groups with axial orientations of the heat pipes of one group disposed at an angle relative to the heat pipes of the other group and axes of the two groups intersecting in the core zone.

2. A nuclear reactor according to claim 1, in which the nuclear fuel comprises substantially cube-shaped elements of which each is provided with two bores containing heat pipes disposed orthogonally to each other and parallel to two of the principal axes of the cube the elements in the core being stacked with the bores of the elements in alignment with each other.

3. A nuclear reactor according to claim 1, in which the diameters of the reactor core bores for the heat pipes are substantially larger than the external diameters of the heat pipes, so that there is clearance between the heat pipes and the walls of the bores in which they are received.

* * * * *